Patented Mar. 12, 1935

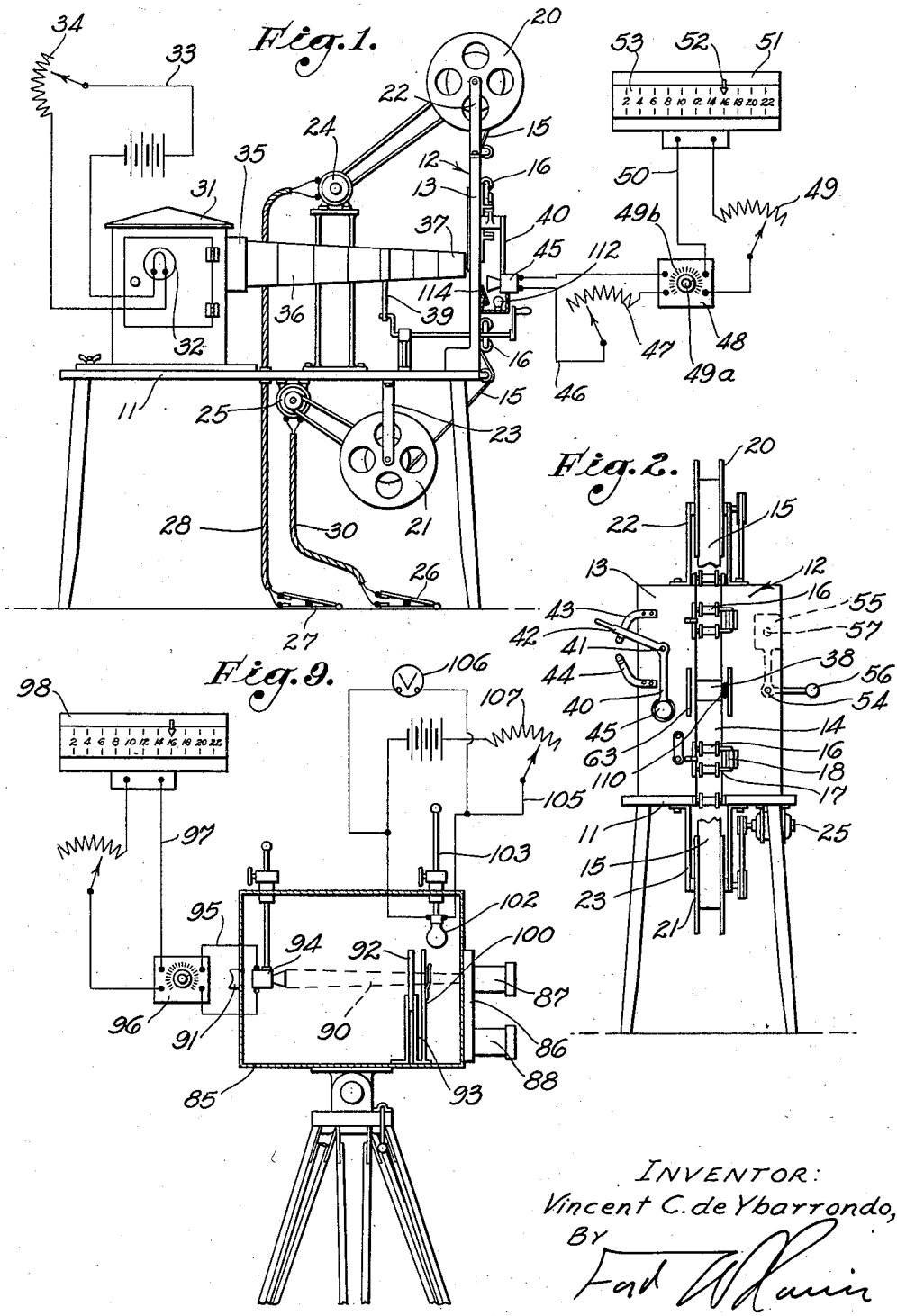

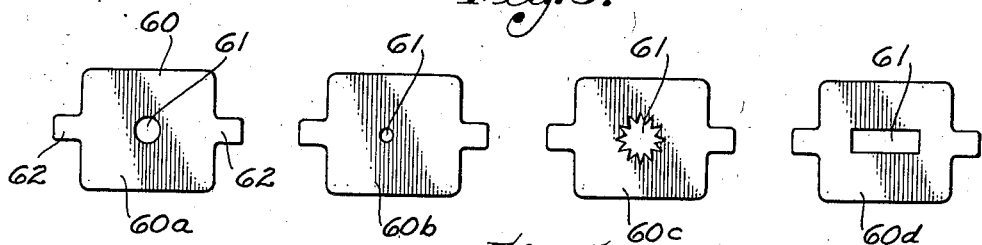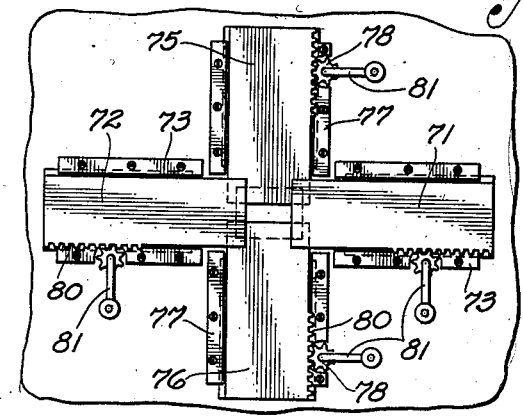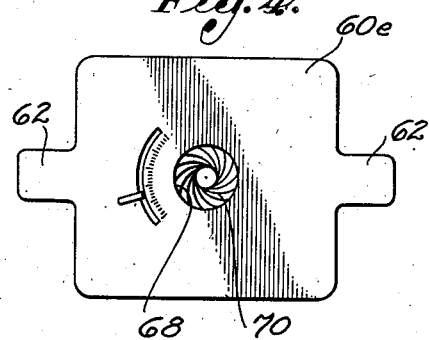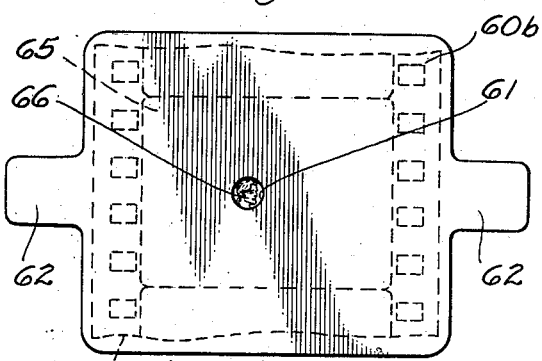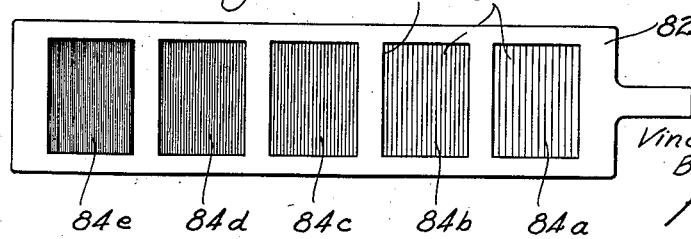

1,993,958

UNITED STATES PATENT OFFICE 1,993,958

FILM EXPOSURE TIMING MACHINE

Vincent C. de Ybarrondo, Los Angeles, Calif., assignor to Patco, Inc., Los Angeles, Calif., a corporation of California Application April 11, 1932, Serial No. 604,599

5 Claims. (Cl. 88—14)

My invention relates to a device for measuring the light contained in a picture or image whether such image is in a natural scene or in the form of a photograph or photographic negative, so that from such measurement of light the proper amount of intensity of light to be subsequently used in the production of a photographic reproduction of the image may be determined. My invention has especial utility in the motion picture art in determining the intensity of light to be employed in printing positive motion picture films from motion picture negatives and for determining the setting of light stops on a photographic camera in the photographing of a natural image or other image.

The present invention constitutes an improvement on a film exposure timing machine such as disclosed in my prior United States Patent No. 1,605,395, granted November 2, 1927, for Apparatus for measuring the heat opacity of photographic film. In testing devices of the character disclosed in my prior patent, rays, such as light rays or heat rays, are passed through a negative photographic transparency, such as a negative motion picture film, and are impinged on a cell which is responsive to such rays in proportion to the strength and amount of the rays. The responsive element may be a photoelectric cell where light rays are employed in testing the film or may be a sensitive thermocouple where heat rays are employed in testing the film. A meter is electrically connected to the responsive element and gives readings which are more or less proportionate to the intensity of the rays impinged on the element. I have found that a thermocouple which measures the heat rays passing through the film gives proportionate readings which are much more accurate than the readings obtained from the use of a selenium cell or photoelectric cell and which are amply accurate for all practical purposes. For ordinary scenes my prior device produces eminently satisfactory results, but in the modern practice of producing photoplays many special lighting effects are employed, with the result that in the ordinary method of timing by the use of my former machine, the faces of the characters appearing in the projected picture may be improperly lighted and therefore indistinct. In the standards which are at present in force a motion picture production is considered acceptable if the lighting of a part of especial interest in the scene, such as the face of a person, is correct.

It is an object of my present invention to provide a device which will time an essential or selected part of the picture image so that the lighting thereof will be correct.

It is a further object of my invention to provide a device of the above character having means for projecting rays from an image to a responsive element and masks or plates having openings therein, these masks or plates being adapted to obscure all but a selected portion of the image, thereby making it possible to select a proper light for the important part of the image.

In the practice of my invention predetermined adjustments of the testing heat or light element and of the heat-responsive or light-responsive measuring equipment are employed. If a portion of a film frame less than the entire area of the frame is to be tested, the light source must be proportionately increased in intensity or the activity of the heat-responsive measuring device must be proportionately increased. For example, to obtain a correct reading where a part of the film frame being used to determine the printing light is half the area of the film frame, either the intensity of the light employed or the heat employed in making a test must be changed in inverse ratio or doubled, or the intensity of the light or heat may be kept constant and the activity of the measuring device may be varied; for example, the amplification produced by the amplifier in the measuring circuit must be doubled where the area of a film being tested is equal to the area of half the film frame.

It is also a feature of the invention to employ in this device a light by-pass or means for subjecting the responsive element or thermopile to a constant light, with the result that the responsive element or thermopile is initially activated by this constant light or heat and is varyingly activated by the varying intensities of light or heat passing through the area of film being measured. This added by-pass light or heat compensates for the light or heat losses due to light or heat absorption by the celluloid film base and emulsion.

Further objects and advantages of the invention will be made evident throughout the following part of the specification.

Referring to the drawings, which are for illustrative purposes only,

Fig. 1 is a side elevation of a form of my invention adapted to time motion picture negatives.

Fig. 2 is a front elevation thereof.

Fig. 3 is a view showing a series of adjustable masks used in the practice of my invention.

Fig. 4 is a view of a mask having an opening which is adjustable to various sizes.

Fig. 5 is a schematic view showing another form of adjustable mask which may be used in the practice of my invention.

Fig. 6 is a view showing a filter screen for use in the practice of the invention where special lighting effects are desired.

Fig. 7 is a view showing a portion of a motion picture film having thereon an image representing a negative image which is to be tested.

Fig. 8 is a view showing the manner in which a mask is applied to the image shown in Fig. 7.

Fig. 9 is a partly sectioned elevational view showing a form of my invention adapted for use in conjunction with the taking of photographs.

In the form of my invention shown in Figs. 1 and 2, I provide a support 11 having a vertical film guiding means 12 mounted at one end thereof, this film guiding means including an upright frame 13 having a vertical channel 14 in which a film 15 is held by means of rollers 16 carried on swingable frames 17 which are hinged to the member 13 at 18. Film spools 20 and 21 may be mounted adjacent the upper and lower ends of the channel 14 by means of brackets 22 and 23, and these spools may be individually driven by motors 24 and 25 adapted to be individually controlled by foot switches 26 and 27 which are connected to the motors 24 and 25 through flexible cables 28 and 30. By a suitable manipulation of the foot switches 26 and 27, a selected motor 24 or 25 may be operated so as to move the film either forwardly or rearwardly. The foot switches 26 and 27 should be of the rheostat type, making it possible to vary the speed of the motors 24 and 25. Adjustably mounted on the support 11 is a housing 31 adapted to hold a ray-producing element 32, which in the ordinary practice of my invention may be a light globe, adapted to be energized through an electric circuit 33 having a rheostat 34 therein for controlling the strength of the current flowing through the ray-producing element 32. Mounted on the front of the housing 31 is a condenser 35, and extending forwardly from the condenser 35 is a telescoping tube 36, the forward end 37 of which coincides with an aperture 38 in the member 13. The tube 36 is preferably equipped with a screen 39 which may be moved into the path of the light passing to the aperture so as to reduce the intensity of the light during the time a film is being inspected before the aperture 38 by the operator. When the actual test of the film is being made, the screen 39 is moved out of the path of the light.

On the front of the member 13 a bracket 40 is pivotally attached at 41, and extending from the inner end of the bracket 40 is an operating lever 42 adapted to engage stops 43 and 44 for holding the bracket 40 in the operative and inoperative positions to which it is swung by the lever 42. Secured to the outer end of the bracket 40 is an element 45 which is responsive to rays from the element 32. The element 45 may be a photoelectric cell, selenium cell, or other cell responsive to light or heat rays, or both together, but in the preferred practice of my invention the element 45 is a sensitive thermocouple or thermopile which, by means of an electric circuit 46 having a rheostat 47 therein, is connected to an amplifier 48 which is in turn connected with a sensitive meter 51 through a circuit 50 having a rheostat 49. When the lever 42 is in raised position, as shown in Fig. 2, the element 45 is swung to one side of the aperture 38.

By swinging the lever 42 downwardly into engagement with the stop 44, the element 45 may be swung over into centralized position in front of the aperture 38, and rays from the element 32 which are permitted to pass through the portion of the film 15 over the aperture 38 will be received by the responsive element 45 which will produce in the circuit 46 a potential corresponding to the quantitative value of the rays received by the element 45. This potential in the circuit 46 produces a minute flow of electricity which is amplified by the amplifier 48 which may be of standard vacuum tube type and which may have one or more graduated adjusting knobs, such as the knob 49a, movable with relation to a graduated scale 49b, with the result that a portion of the stronger current passes through the circuit 50 and causes the needle 52 of the meter 51 to move across a scale 53 which may be graduated to show the strength of printing light to be subsequently employed in printing a positive from the film 15. Where the light is strong enough and where the thermopile is used, amplification is not a necessity unless desired.

Hinged at 54 to the member 13 is a master shutter 55 provided with a lever 56 whereby it may be swung into position covering the aperture 38. The master shutter 55 is provided with an opening 57 which may or may not be fitted with a filter. The master shutter 55 is employed for the purpose of setting or checking the timing machine to see that the parts thereof are properly adjusted. For instance, the opening 57 of the shutter 55 may be such that when the intensity of the rays delivered by the element 32 are at a proper value, and the rheostats 47 and 49 in the circuits 46 and 50 are properly set, the needle 52 of the meter 51 will swing to a predetermined point, such, for instance, as 16. If, in making this test, the reading 16 is not obtained, the rheostat 34 in the circuit 33 is adjusted so as to change the flow of current through the element 32 whereby to increase or decrease the intensity of the rays delivered and thereby obtain the desired test reading on the meter 51.

For use in the practice of the invention I provide a plurality of masks or plates 60 which are individually designated as 60a, 60b, 60c, and 60d in Fig. 3. These plates have openings 61 therein of various sizes and shapes, and from the ends of the plates handle members in the form of extensions 62 are projected. On the face of the member 13, on each side of the aperture 38, holding means for the plates 60 are provided, these holding means consisting of flat springs 63 adapted to engage the extensions 62. To illustrate the manner in which the device may be used, I show in Fig. 7 a frame 65 of the film 15 in position over the aperture 38. This frame 65 represents a part of a scene in a motion picture, and although it is understood that the film 15 is a negative, I have represented the scene or view or image as a positive for the purpose of showing the parts thereof in a simple manner. In this image the essential part, or part which is of particular interest to the viewer of the final production, is the face 66 of the person appearing in the scene. Therefore, in order to properly display the scene on a screen, it is necessary that the face 66 be shown with proper light. To accomplish the timing of this part, a mask or plate 60 is selected, such as the mask 60b, having an opening 61 therein of substantially the same size as the face 66. Then, as shown in Fig. 8, the mask 60b is placed over the frame 65 which is in front of the aperture 38 of the timing device with the metal fingers 63 resting thereagainst, and the mask 60b is moved until the opening 61 thereof coincides with the face 66.

The reduction of area of the apertures through which the testing light or heat passes is compensated for, either by changing the intensity of the light produced by the lamp 32 by changing the setting of the rheostat 34 in accordance with the calibrated value which may be indicated on the mask 60b, or by adjusting the current flow conditions of the circuit connected with the meter 51, as by setting the knob 49a of the amplifier 48 so as to increase the amplification of current initiated by the thermopile 45 and received by the meter 51. Under some conditions the changing of the light intensity or the amplification of the circuit 50 may be in direct inverse proportion to the change in the area of the aperture through which the testing light passes, but this condition is not essential to the practice of my invention for the reason that the masks may be calibrated experimentally on the device and may be marked with the rheostat or amplifier settings to be employed to give proper results. The element 45 is then swung into position aligned with the aperture 38 so that the heat rays passing through the selected part, or face 66, of the image will be impinged on the element 45 and will cause a current to flow in the circuit 46 and an amplified current to flow in the circuit 50, with the result that the needle 52 will swing over and indicate the proper strength of printing light to be employed in printing the scene represented by the frame 65. It will be perceived that the determination of the proper light to use in printing the scene is obtained from the selected part of interest in the scene.

In Fig. 4 I show a mask 60e having therein an opening 68 fitted with an iris 70 of the character employed in cameras for adjusting a camera aperture. This mask 60e may be employed in place of masks 60a and 60b and may be adjusted to proper size when in place over the frame of the film being tested.

In Fig. 5 I show horizontally movable plates 71 and 72 mounted in horizontal guides 73 on opposite sides of the aperture 38 and vertically slidable plates 75 and 76 mounted in vertical guides 77 disposed above and below the aperture 38. For moving the plates 71, 72, 75, and 76 outwardly, I provide spur gears 78 which engages racks 80 formed in the edges of the plates, there being handles 81 for suitably turning the gears 78. The plates 71, 72, 75 and 76 may be adjusted so as to expose a quadrilateral area of a size equivalent to the aperture 38, or smaller, at any desired position within the area defined by the aperture 38.

It is a feature of my invention to provide a means for placing filter members of different densities in the path of the light which travels from an image being checked and the responsive element 45 so that various special lighting effects may be obtained by using printing lights of intensity different from that which would be used under ordinary circumstances. In Fig. 6 I show a filter frame 82 having a series of openings 83 therein in which are fitted filters 84 specifically designated as 84a, 84b, 84c, 84d, and 84e and being progressively of greater density. When a lighting effect differing from normal is desired, the operator places one of the filters 84 in front of the aperture so that the filter will be interposed in the path of rays which are passing to the responsive element 45.

In Fig. 9 I schematically show a form of my invention adapted to obtain a light reading directly from a scene which is to be photographed so that the cameraman may properly set the light stop of the camera to give a required amount of exposure. This form of the invention provides a housing 85 having a turret 86 equipped with photographic lenses 87 and 88 adapted to project an image along the path indicated by dotted lines 90. An eye piece 91 is provided at the rear of the housing 85 for viewing an image cast upon a ground glass screen 92 which may be moved from the position in which it is shown, downwardly on vertical slides 93, into a position outside the path 90. When the screen 92 is moved downwardly, a ray-responsive element 94 may be lowered into a position to receive the rays which are projected inwardly by the lens 87 to impinge on the responsive element 94 and causing a current flow in a circuit 95 connected to an amplifier 96 which is in turn connected through a circuit 97 with a sensitive meter 98. In front of the position of the screen 92 is a slide 100 in which various masks 60a, 60b, 60c, 60d, and 60e may be placed for the purpose of selecting any desired part of the image projected through the path 90 by the lens 87, thereby making it possible to obtain a reading of the light value in the selected area. For originally checking the device, I provide a standard lamp 102 which is mounted on a vertically slidable rod 103 so that it can be lowered into a position in front of the slide 100. This standard lamp 102 is energized through an electric circuit 105 having a voltmeter 106 and a rheostat 107 connected therewith so that a standard energization of the lamp 102 may be at any time obtained. When it is desired to check the device, a standard mask or shutter, such as the shutter 55 shown in Fig. 2, is placed in the slide 100, and the lamp 102 is lowered into position in front of the standard shutter so that a predetermined strength of ray energy will pass through the standard shutter and impinge the responsive element 94.

Where my film testing device is employed with the masks, a constant by-pass light may be passed to the thermopile 45 through an opening 110, as shown in Fig. 2, formed at one side of the aperture 38. Through this aperture a constant light passes to the thermopile and produces an initial activation thereof, and at the same time compensates for light and heat losses in the film. When the masks shown in the various figures are employed, the added or compensating light or heat may be derived from a source separate from the lamp 31, such as by use of a small lamp 112, as shown in Fig. 1, mounted adjacent the thermopile, and the light and heat therefrom may be reflected into the thermopile by use of a mirror 114.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A film exposure timing device of the character described, including: a circuit having therein a member for varying the characteristics of electricity in said circuit in response to rays received by said member; means for projecting rays through a path extending to said member; means for interposing a photographic transparency in said path; masking means having a small light passage for blocking off all but a selected area of said transparency, means to movably mount said masking means over said transparency for adjustment to bring the light passage of said masking means into register with selected portions of said transparency; and a meter in said circuit for measuring the characteristics of said electricity in said circuit.

2. A film exposure timing device of the character described, including: a member responsive to rays; means for projecting rays through a path extending to said member; means for interposing a photographic transparency in said path; masking means providing a relatively small light passage for blocking off all but a selected area of said transparency, means for mounting said masking means over said transparency for adjustment to bring said light passage into register with selected portions of said transparency; and metric means for measuring the response of said member to the rays impinged thereon.

3. A film exposure timing device of the character described, including: a member responsive to rays; means for projecting rays through a path extending to said member; means for interposing a photographic transparency in said path; a mask having a small light passage for blocking off all but a selected area of said transparency; means for mounting said mask over said transparency, said mask being adapted for adjustment to bring said light passage into register with selected portions of said transparency; and metric means for measuring the response of said member to the rays impinged thereon.

4. A film exposure timing device of the character described, including: a member responsive to rays; means for projecting rays through a path extending to said member; means for interposing a photographic transparency in said path; a plate having a small light passage for blocking off all but a selected area of said transparency; and means for movably mounting said plate over said transparency for adjustment to bring said light passage into register with selected portions of said transparency.

5. A film exposure timing device of the character described, including: a circuit having therein a member for varying the characteristics of electricity in said circuit in response to rays received by said member; means for projecting rays through a path extending to said member; means for interposing a photographic transparency in said path; masking means providing a small light passage for blocking off all but a selected area of said transparency, said masking means being adapted for adjustment over said transparency so as to bring said light passage into register with selected portions of said transparency; a meter in said circuit for measuring the characteristics of said electricity in said circuit and showing a reading of such characteristics; and means for varying the characteristics of said electricity in said circuit in compensation for the blocking off of the non-selected area of said transparency by said masking means.

VINCENT C. DE YBARRONDO.